(12) United States Patent
Kim et al.

(10) Patent No.: US 8,167,472 B2
(45) Date of Patent: May 1, 2012

(54) OPTICAL SHEET AND METHOD OF MANUFACTURING THE SAME

(75) Inventors: Dong-Hoon Kim, Seoul (KR); Jin-Sung Choi, Cheonan-si (KR); Joong-Hyun Kim, Suwon-si (KR); Seung-Hwan Chung, Anyang-si (KR); Seung-Mo Kim, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 931 days.

(21) Appl. No.: 12/190,810

(22) Filed: Aug. 13, 2008

(65) Prior Publication Data

US 2009/0180298 A1 Jul. 16, 2009

(30) Foreign Application Priority Data

Jan. 11, 2008 (KR) ........................ 10-2008-0003620

(51) Int. Cl.
*F21V 7/04* (2006.01)

(52) U.S. Cl. ......... 362/606; 362/607; 362/336; 362/615
(58) Field of Classification Search .................. 362/606, 362/620, 331, 332, 333, 334, 336, 337, 338; 349/62; 359/599

See application file for complete search history.

(56) References Cited

U.S. PATENT DOCUMENTS

| | | | | |
|---|---|---|---|---|
| 6,025,897 A | * | 2/2000 | Weber et al. | 349/96 |
| 6,861,121 B2 | * | 3/2005 | Matsunaga et al. | 428/141 |
| 7,006,293 B2 | * | 2/2006 | Kuo et al. | 359/599 |
| 7,400,817 B2 | * | 7/2008 | Lee et al. | 385/146 |
| 2005/0007513 A1 | * | 1/2005 | Lee et al. | 349/57 |
| 2008/0137367 A1 | * | 6/2008 | Kim et al. | 362/607 |

FOREIGN PATENT DOCUMENTS

| | | |
|---|---|---|
| JP | 2006-78917 | 3/2006 |
| KR | 10-0558161 | 3/2006 |
| KR | 10-2007-0024090 | 3/2007 |

OTHER PUBLICATIONS

English Language Abstract from Patent Abstracts of Japan for JP Publication No. 2006-078917, Mar. 23, 2006, 1 page.
English Language Abstract from Korean Intellectual Property Office for KR Publication No. 1020070024090, Mar. 2, 2007, 1 page.
English Language Abstract from Korean Intellectual Property Office for KR Publication No. 100558161, Feb. 28, 2006, 1 page.

* cited by examiner

*Primary Examiner* — Ali Alavi
(74) *Attorney, Agent, or Firm* — Innovation Counsel LLP

(57) ABSTRACT

An optical sheet (140) includes a base layer (142a) and a light condensing pattern (142b) formed on the base layer integrally with the base layer and including one or more peaks and one or more valleys. Each of the base layer and the light condensing pattern includes a continuous phase and a dispersed phase. The dispersed phase is stretched in a main stretching direction.

26 Claims, 6 Drawing Sheets

OPTICAL SHEET AND METHOD OF MANUFACTURING THE SAME

CROSS-REFERENCE TO RELATED APPLICATION

This application claims priority to and the benefit of South Korean Patent Application No. 10-2008-0003620, filed in the South Korean Intellectual Property Office on Jan. 11, 2008, the disclosure of which is incorporated herein by reference in its entirety.

BACKGROUND OF THE INVENTION

1. Field of the Invention

The present invention relates to optical sheets. Some embodiments of the optical sheets are used in liquid crystal displays (LCD), and allow the LCD thickness to be reduced.

2. Description of the Related Art

Liquid crystal display (LCD) devices are flat panel display devices popular for their light weight, thin shape, and low power consumption. An LCD device includes an LCD module driven by a driving circuit. The LCD module includes an LCD panel containing a matrix of liquid crystal cells arranged between two insulating substrates. The LCDs are not self-emissive, so the LCD module may include a backlight assembly for lighting the LCD panel.

The backlight assembly is disposed at the rear of the LCD, and includes a light source, a light guide plate for guiding light emitted by the light source, a reflection sheet disposed on the bottom of the light guide plate, and optical sheets stacked on top of the light guide plate. The stack of optical sheets consists, from bottom to top, of a diffusion sheet, a prism sheet and a protection sheet.

SUMMARY

This section summarizes some features of some embodiments of the invention. Other features are described in subsequent section. The invention is defined by the appended claims, which are incorporated into this section by reference.

As stated above, an LCD device may contain a diffusion sheet and a prism sheet, but multiple optical sheets increase the LCD thickness and the complexity of the LCD structure. Accordingly, in some embodiments of the present invention, a single optical sheet functions both as a diffusion sheet and a prism sheet, thus possibly simplifying the manufacturing process, reducing the manufacturing cost, and reducing the thickness of the LCD device.

In accordance with an aspect of the present invention, there is provided an optical sheet including: a base layer; a light condensing pattern formed on the base layer and including a peak and a valley; and a dispersed phase stretched in a main stretching direction in the base layer and the light condensing pattern, wherein the base layer and the light condensing pattern are formed integrally.

The base layer and the light condensing pattern may be formed of at least one transparent resin selected from the group consisting of polystyrene (PS) and polyethylene naphthalate (PEN), and the dispersed phase may be formed of at least one transparent resin selected from the group consisting of a copolymer of polyethylene naphthalate (co-PEN) and syndiotactic polystyrene (sPS).

The content of the dispersed phase stretched in the base layer and the light condensing pattern may be in the range of about 5 wt % to about 40 wt %.

The dispersed phase may be stretched in the main stretching direction and in a secondary stretching direction perpendicular to the main stretching direction.

A wavelength in a direction parallel to the main stretching direction may be transmitted and a wavelength in a direction parallel to the secondary stretching direction may be reflected.

A stretching ratio in the main stretching direction with respect to the secondary stretching direction may be in the range of about 3 to about 5.

An embossing pattern may be provided on the bottom surface of the optical sheet.

The peak of the light condensing pattern may have a cross section of an isosceles or scalene triangle.

The peak may be formed in a straight line or curved line shape.

The peak may have an angle in the range of about 85° to about 95°.

The peak may have a rounded vertex.

The light condensing pattern may have a polygonal cross section.

In accordance with another aspect of the present invention, there is provided a backlight assembly including: an optical sheet including a base layer, a light condensing pattern formed on the base layer, and a dispersed phase stretched in a main stretching direction in the base layer and the light condensing pattern, the base layer and the light condensing pattern being formed integrally; a light source provided on the bottom of the optical sheet and transmitting light to the optical sheet; and a reflection sheet disposed on the bottom of the light source and reflecting the light emitted from the light source to the bottom thereof upward.

In accordance with still another aspect of the present invention, there is provided a method of manufacturing an optical sheet, the method including: preparing a mixed resin in which a continuous phase resin and a dispersed phase resin are mixed; forming a base layer by extruding the mixed resin; forming a light condensing pattern on one surface of the base layer; and stretching the base layer and the light condensing pattern in a main stretching direction.

In forming the base layer may include forming an embossing pattern on the bottom surface of the base layer.

The continuous phase resin may be formed at least one transparent resin selected from the group consisting of polystyrene (PS) and polyethylene naphthalate (PEN), and the dispersed phase resin may be formed of at least one transparent resin selected from the group consisting of a copolymer of polyethylene naphthalate (co-PEN) and syndiotactic polystyrene (sPS).

The content of the dispersed phase stretched in the base layer and the light condensing pattern may be in the range of about 5 wt % to about 40 wt %.

The dispersed phase may be stretched in the main stretching direction and in a secondary stretching direction perpendicular to the main stretching direction.

A wavelength in a direction parallel to the main stretching direction may be transmitted and a wavelength in a direction parallel to the secondary stretching direction may be reflected.

The stretching ratio in the main stretching direction with respect to the secondary stretching direction may be in the range of about 3 to about 5.

DESCRIPTION OF SOME EMBODIMENTS

Some embodiments of the present invention will now be described with reference to FIGS. 1 to 6.

Figure 1:
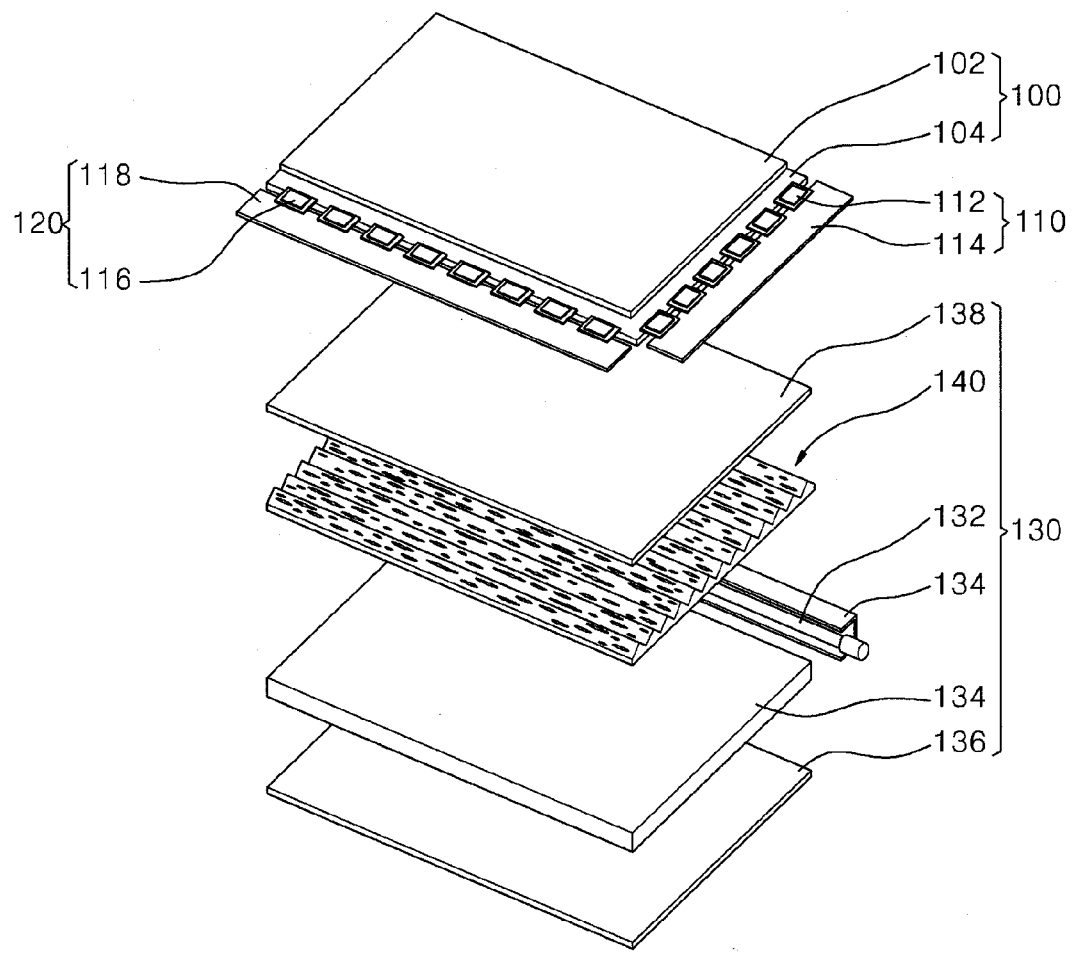
FIG. 1 is a perspective view showing a liquid crystal display device including a backlight assembly in accordance with an exemplary embodiment of the present invention.

FIG. 1 is a perspective view showing a liquid crystal display (LCD) device including a backlight assembly in accordance with an exemplary embodiment of the present invention. The LCD device of FIG. 1 includes an LCD panel 100, panel drivers 110 and 120, and a backlight assembly 130. The LCD panel 100 includes a thin film transistor (TFT) substrate 104 and a color filter substrate 102 facing each other and attached to each other, with a liquid crystal layer interposed therebetween for controlling the amount of light passing through the LCD panel. The color filter substrate 102 includes a black matrix for preventing light leakage, a common electrode for forming a vertical electric field induced by the voltage between the common electrode and the pixel electrodes, a color filter array, and an upper alignment layer formed on the color filter array for the liquid crystal alignment.

The TFT substrate 104 includes gate lines and data lines transverse to the gate lines. The TFT substrate 104 also includes a TFT array, with at least one TFT provided at each intersection of a gate line with a data line. Pixel electrodes are connected to the TFTs in TFT substrate 104. The TFT substrate 104 also includes a lower alignment layer formed on the TFT array for the liquid crystal alignment.

The panel driver 110 is a gate driver that drives the gate lines of the LCD panel 100. The panel driver 120 is a data driver that drives the data lines.

The gate driver 110 includes a gate printed circuit board (PCB) 114 and a gate integrated circuit (IC) 112 mounted on a gate tape carrier package (TCP) disposed between the gate PCB 114 and the TFT substrate 104.

The gate IC 112 sequentially supplies a scan signal of a gate high voltage to the gate lines, and drives each gate line with a gate low voltage when the gate line is not being supplied with the gate high voltage. The gate IC 112 receives via gate PCB 114 a control signal and power from a timing control unit and a power supply that are mounted on a data PCB 118.

The data driver 120 includes the data PCB 118 and a data IC 116 mounted on a data TCP disposed between the data PCB 118 and the TFT substrate 104.

The data IC 116 converts pixel data to analog pixel signals and supplies the analog pixel signals to the data lines. The data PCB 118 transmits a control signal, power, and pixel data from the timing control unit and the power supply to the data IC 116.

The backlight assembly 130 includes a light source 132, a light guide plate 134, an optical sheet 140, and a reflection sheet 136.

The light source 132 can be one or more lamps or light emitting diodes formed on one side of the light guide plate 134.

The light guide plate 134 guides the light emitted by the light source 132 to the LCD panel 100. For this purpose, the surface of the light guide plate 134 is treated to have a concave-convex or dotted shape to enhance refraction and diffusion of light transmitted to the LCD panel 100. The light guide plate 134 may be formed of polymethylmethacrylate (PMMA) which is resistant to breakage and deformation due to its high strength and has a high transmittance.

The reflection sheet 136 is disposed on the rear side of the light guide plate 134. The light emitted from the light source 132 and reaching the rear surface of the light guide plate 134 is reflected by the reflection sheet 136 toward the LCD panel 100. The reflection sheet 136 may be formed by providing a high-reflectivity coating on a base material. Suitable base materials include steel use stainless (SUS), brass, aluminum (Al), and polyethyleneterephthalate (PET). Suitable high-reflectivity coatings include aluminum (Al) and titanium (Ti).

The optical sheet 140 is disposed on top of the light guide plate 134 to effectively transmit the light emitted by the light source 132 and reaching the top surface of the light guide plate 134 toward the LCD panel 100. The optical sheet 140 is formed by stretching a polymer obtained by mixing a continuous phase polymer and a dispersed phase polymer. The stretching induces birefringence in each of the continuous and dispersed phase polymers to impart a reflection polarization effect to the optical sheet 140. Further, the optical sheet 140 is fabricated to have peaks and valleys in its surface to concentrate light to perform a light condensing function. Each peak and valley may traverse the entire optical sheet 140 in a predefined direction, but this is not necessary. Accordingly, a single optical sheet performs the light condensing function and the reflection polarization function, thus simplifying the manufacturing process. In addition, the continuous and disperse phases of the optical sheet 140 may have different refraction indices in any given direction for enhanced light dispersion.

A diffusion sheet 138 may optionally be provided on the optical sheet 140 to improve the light efficiency. The diffusion sheet 138 may be omitted, and its desirability depends on the product requirements. Alternatively, a protection sheet (not depicted) may be provided instead of the diffusion sheet 138.

While the backlight assembly 130 of the present embodiment is an edge type backlight assembly, the present invention is also applicable to direct type backlight assemblies.

Figure 2:
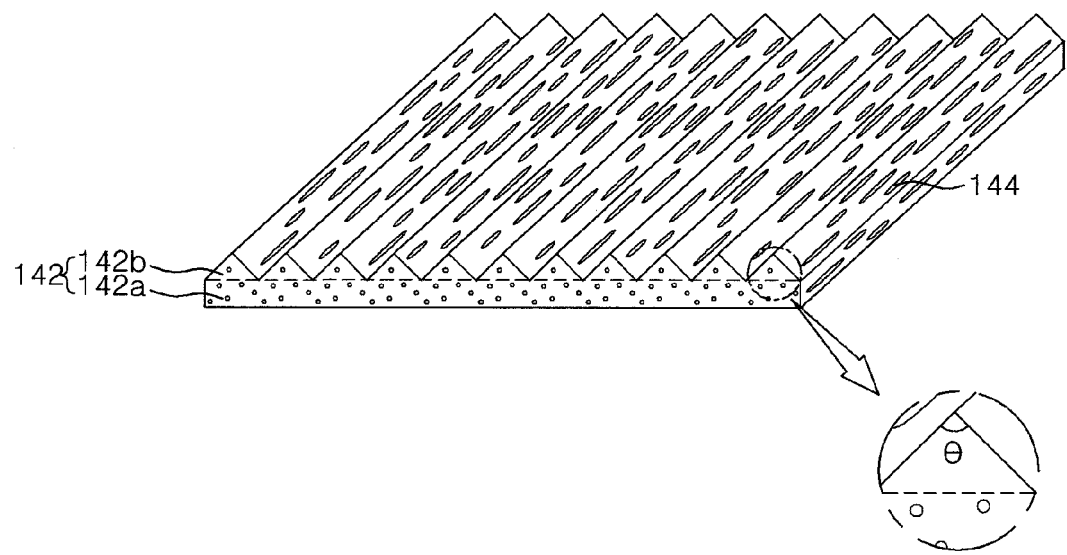
FIG. 2 is a perspective view showing an optical sheet in accordance with a first exemplary embodiment of the present invention.

FIG. 2 is a perspective view showing an optical sheet 140 in accordance with a first exemplary embodiment of the present invention. The optical sheet 140 of FIG. 2 includes a continuous phase 142 which consists of a base layer 142a and a light condensing pattern 142b formed on the base layer 142a and having peaks and valleys. A dispersed phase 144 is dispersed throughout the continuous phase 142 and is stretched in a main stretching direction. The main stretching direction is parallel to the longitudinal direction of the peaks and valleys, but this is not necessary. The base layer 142a and the light condensing pattern 142b may be formed integrally with each other.

The continuous phase 142 and the dispersed phase 144 are formed of a transparent resin and then stretched in at least one predetermined direction (the main stretching direction). The stretching directions and ratios are discussed below in connection with FIG. 6. The continuous phase 142 may be formed of a transparent resin selected from the group consisting of polystyrene (PS) and polyethylene naphthalate (PEN). The dispersed phase 144 is formed of a transparent resin selected from the group consisting of a copolymer of polyethylene naphthalate (co-PEN) and syndiotactic polystyrene (sPS).

The weight of the dispersed phase 144 may be about 5 wt % to about 40 wt % of the total weight of the continuous phase 142 and the dispersed phase 144. Note that the weight is given relative to the total of the continuous and dispersed phases. When the content of the dispersed phase 144 is less than about 5 wt % or exceeds about 40 wt %, the reflection polarization function may be significantly impeded.

The light condensing pattern 142b having peaks and valleys is provided on one side of the optical sheet 140. In a vertical cross section perpendicular to the longitudinal direction of the peaks and valleys (i.e. to the main stretching direction), the peaks of the light condensing pattern 142b may be isosceles or scalene triangles. The peak angle θ may be in the range of about 85° to about 95°. When the peak angle θ is less than about 85° or exceeds about 95°, the light condensing efficiency may be significantly reduced.

As described above, a single optical sheet in accordance with this embodiment can perform both the light condensing and light diffusing functions, thus replacing a combination of optical sheets such as a diffusion sheet, a prism sheet, and so on.

Figure 3:
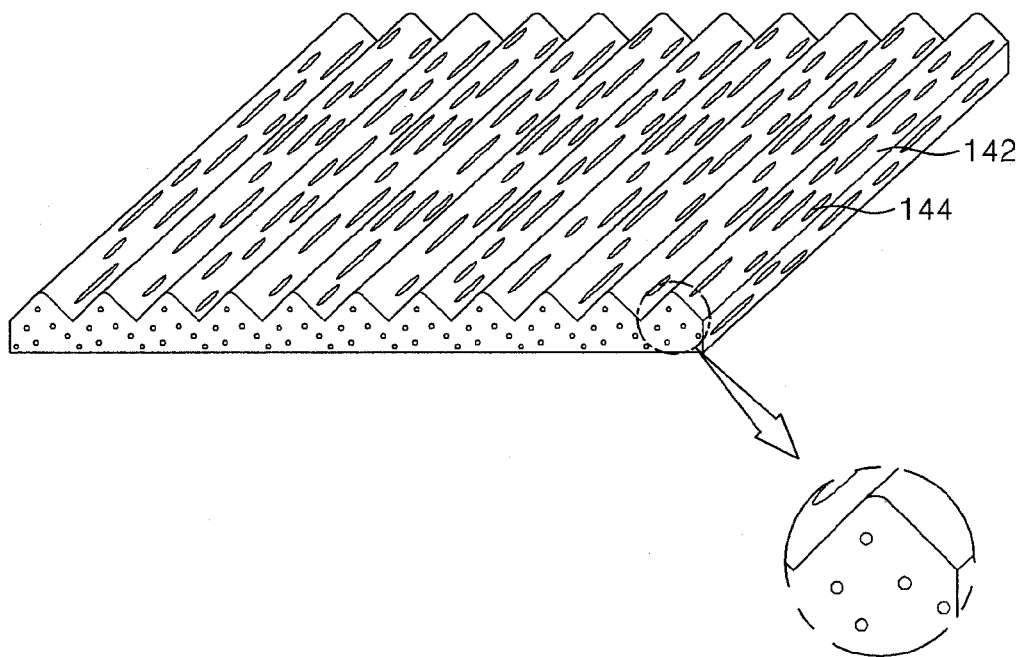
FIG. 3 is a perspective view showing an optical sheet in accordance with a second exemplary embodiment of the present invention.

FIG. 3 is a perspective view showing an optical sheet in accordance with a second exemplary embodiment of the present invention. This embodiment is identical to the embodiment of FIG. 2 except that the peaks of FIG. 3 have rounded vertices. The rounded vertices reduce friction with the LCD panel 100 disposed on top of the optical sheet 140, making a protection sheet less important or unnecessary. The rounded vertices of the optical sheet 140 may have a diameter in the range of about 1 to about 8 micrometers depending on the desired light condensing and reflection polarization functions of the optical sheet 140.

Figure 4:
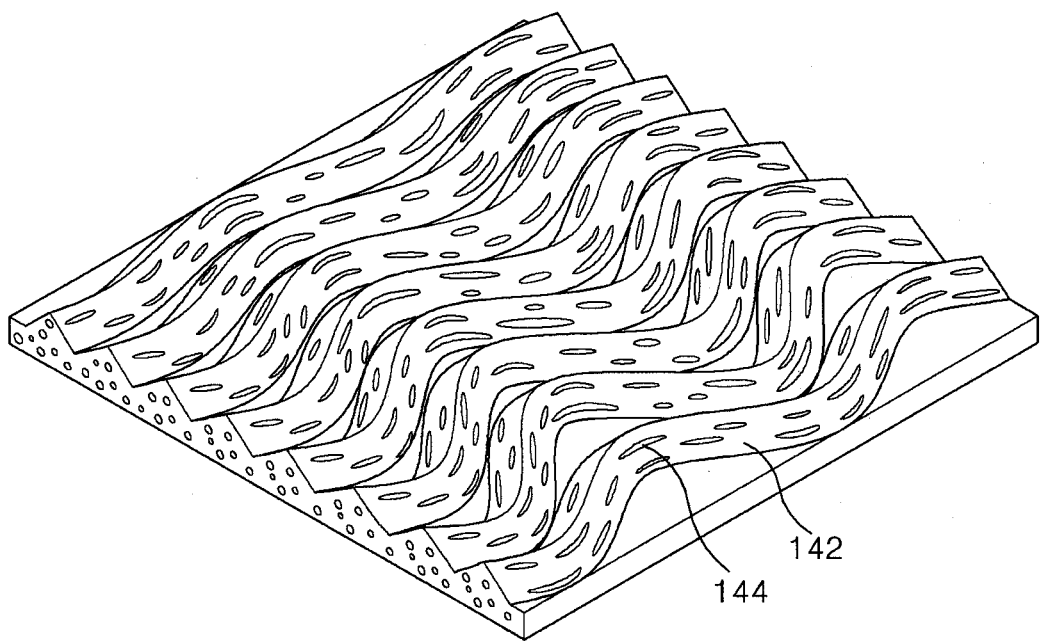
FIG. 4 is a perspective view showing an optical sheet in accordance with a third embodiment of the present invention.

FIG. 4 is a perspective view showing an optical sheet in accordance with a third embodiment of the present invention. The optical sheet 140 of FIG. 4 is the same as in FIG. 2 except that the peaks have irregular curved shapes. The peaks' irregular curved shapes of the optical sheet 140 help prevent a moire phenomenon caused by superposition of regular patterns on the display.

In the particular embodiment of FIG. 4, each peak is triangular in a vertical cross section perpendicular to the peak's longitudinal direction, but the peaks' ridges are curved rather than straight as in FIGS. 2 and 3. Non-triangular peaks are possible. Each peak generally extends in the main stretching direction, but the peak's ridge may be curved and therefore is not necessarily strictly parallel to this direction. The particles of the dispersed phase 144 are not parallel to each other or to the main stretching direction as in FIGS. 2 and 3, and each particle's longitudinal axis may be curved. The particles are elongated, and have longer projections on a vertical plane parallel to the main stretching direction than on a vertical plane perpendicular to the main stretching direction.

The peaks may also have other shapes. For example, a polygonal shape with any number of sides is possible for a peak's vertical cross section perpendicular to the main stretching direction.

Figure 5:
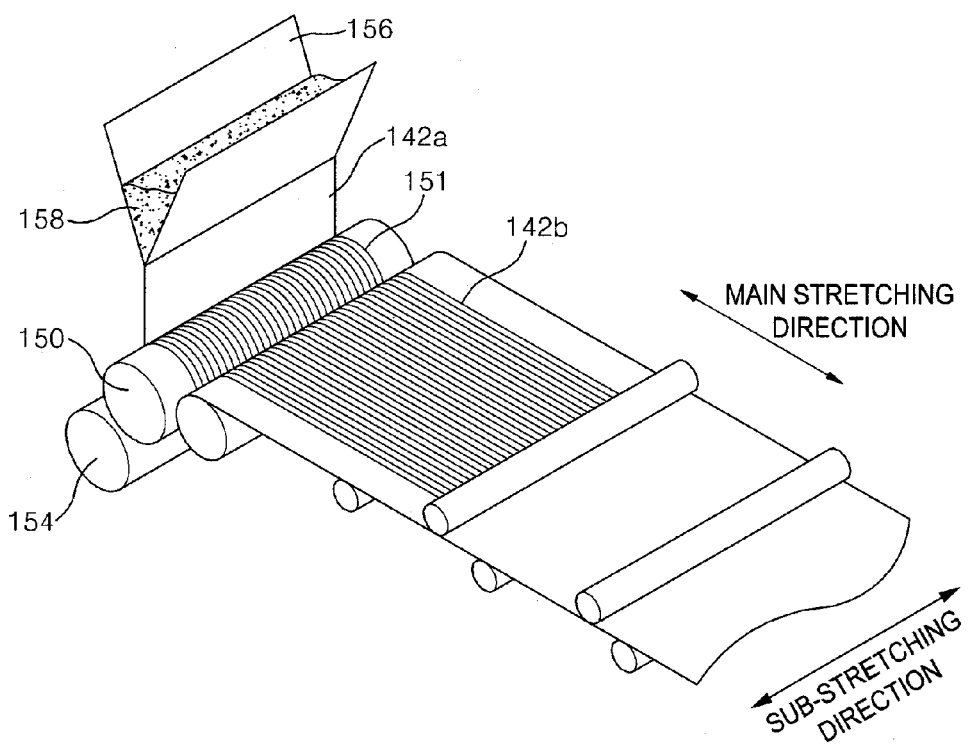
FIG. 5 is illustrates one embodiment of a method of manufacturing an optical sheet.

FIG. 5 is a diagram illustrating one embodiment of a method of manufacturing an optical sheet. This method includes preparing a mixed resin 158 as a mixture of a continuous phase resin and a dispersed phase resin, forming the base layer (containing the continuous phase 142a and also containing the dispersed phase 144) by extruding the mixed resin 158, forming the light condensing pattern 142b on one surface of the base layer 142a, and stretching the base layer 142a and the light condensing pattern 142b in the main stretching direction. Of note, numeral 142a as is used herein may denote either the continuous phase 142a or the combination of the continuous phase 142a with the dispersed phase. Likewise, numeral 142b may denote either the continuous phase in the light condensing pattern or the combination of the continuous and dispersed phases of the light condensing pattern.

The mixed resin 158 is formed by mixing a continuous phase resin selected from the group consisting of polystyrene (PS) and polyethylene naphthalate (PEN), and a dispersed phase resin selected from the group consisting of a copolymer of polyethylene naphthalate (co-PEN) and syndiotactic polystyrene (sPS). The constituent polymers in the mixed resin 158 can be selected to match each other as needed. For example, if the continuous phase resin is polystyrene, the dispersed phase resin may be syndiotactic polystyrene (sPS), and in the case where the continuous phase resin is polyethylene naphthalate (PEN), the dispersed resin may be the copolymer of polyethylene naphthalate (co-PEN).

The base layer 142a is a sheet formed by extruding the mixed resin 158 through an extrusion T-die 156.

The light condensing pattern 142b is formed by passing the base layer 142a through a micro pattern roll 150 which includes a micro pattern 151 causing formation of the light condensing pattern 142b on the base layer 142. Additionally, when passing the base layer 142a through the micro pattern roll 150, an embossing pattern (not depicted) may be formed on the rear surface of the base layer 142a using an embossing roll 154. The embossing pattern serves to reduce friction with the light guide plate disposed at the bottom surface of the optical sheet and thus reduce static electricity.

The base layer 142a with the light condensing pattern 142b is stretched in the main stretching direction and in a secondary stretching direction perpendicular to the main stretching direction. The stretching in two directions serves to make the base layer 142a more resistant to being broken by stretching pressure compared to stretching only in one direction. In the related art, the main stretching direction is generally called a machine direction (MD) and the secondary stretching direction perpendicular to the MD is generally called a transverse direction (TD).

Figure 6:
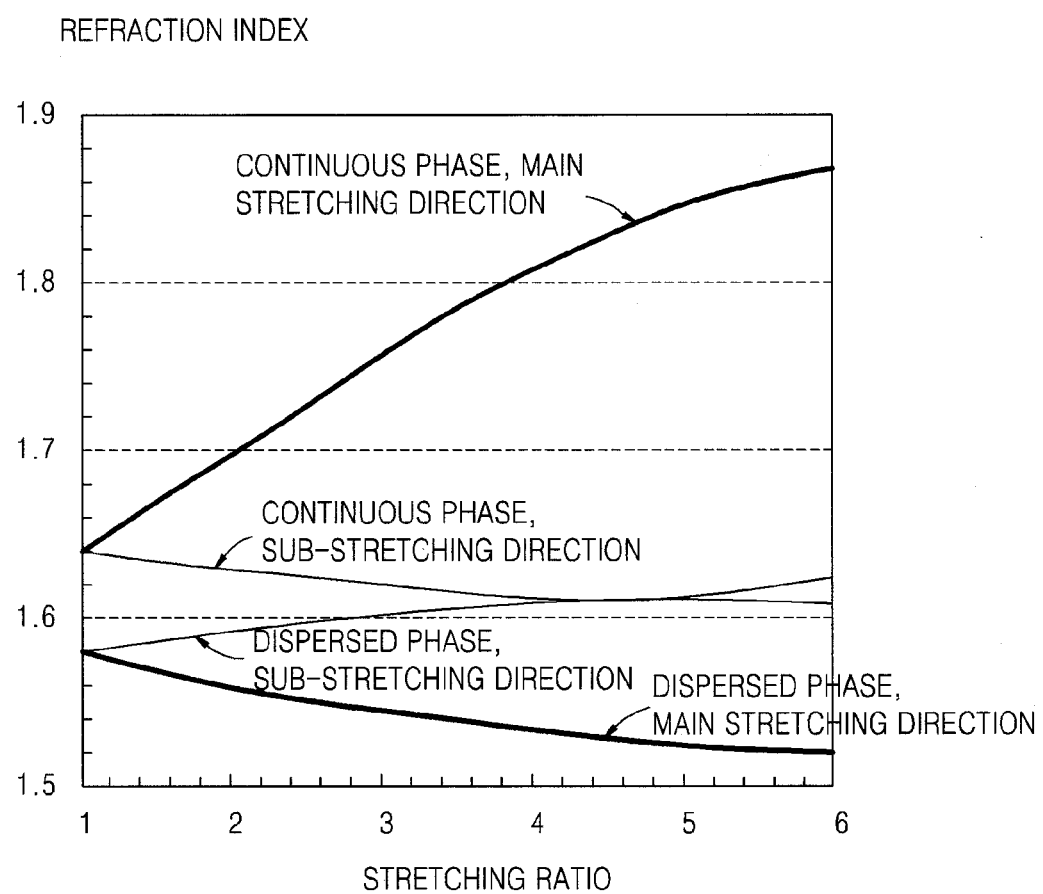
FIG. 6 is a graph showing refraction indices as functions of the stretching ratios for optical sheets stretched according to some embodiments of the present invention.

The stretching ratio in the main stretching direction with respect to the transverse stretching direction will now be discussed in connection with FIG. 6. FIG. 6 is a graph showing the refraction indices of the continuous and dispersed phases as functions of the stretching ratio in the main stretching direction with respect to the secondary stretching direction (the secondary stretching direction is referred to as "sub-stretching direction" in FIG. 6). The light oscillating in parallel to the main stretching direction (i.e. the light having its electric field vector parallel to the main stretching direction) is transmitted and the light oscillating in parallel to the secondary stretching direction is reflected. When the stretching ratio of the main stretching direction with respect to the secondary stretching direction is increased, the refraction indices of the continuous and dispersed phases in the secondary stretching direction are substantially unchanged, whereas the refraction indices of the continuous and dispersed phases in the main stretching direction change substantially. Accordingly, polarization is obtained with a transmission axis oriented in the main stretching direction due to each of the continuous and dispersed phases having different refraction indices in the main and secondary stretching directions.

The stretching ratio (i.e. the ratio of the stretching proportions) in the main stretching direction with respect to the secondary stretching direction may be in the range of 3 to 5.

When the stretching ratio is less than 3, the difference in the refraction indices of each of the continuous and dispersed phases in the main and secondary stretching directions is too small to produce strong polarization, and when the stretching ratio exceeds 5, the optical sheet may be broken by the stretching pressure. Accordingly, the stretching ratio may be optimized in the range of about 3 to about 5 to obtain the polarization effect through the difference in the refraction indices in the main and secondary stretching directions.

As described above, the optical sheet in accordance with some embodiments of the present invention can effectively perform the light condensing and diffusing functions with a single sheet acting both as a diffusion sheet and a prism sheet. Moreover, the optical sheet can improve the efficiency of the backlight assembly, provide a thinner display device, simplify the manufacturing process, and reduce the manufacturing cost.

The invention is not limited to the exemplary embodiments described above. Other embodiments and variations are within the scope of the invention as defined by the appended claims.

What is claimed is:

1. An optical sheet comprising:
   a base layer; and
   a light condensing pattern formed on the base layer integrally with the base layer and including one or more peaks and one or more valleys,
   wherein the base layer and the light condensing pattern comprise a continuous phase and a dispersed phase,
   wherein the dispersed phase is stretched in a first direction,
   wherein the dispersed phase is stretched in the first direction and in a second direction perpendicular to the first direction, and
   wherein the optical sheet transmits light oscillating in parallel to the first direction and reflects light oscillating in parallel to the second direction.

2. The optical sheet of claim 1, wherein the continuous phase is formed of at least one transparent resin selected from the group consisting of polystyrene (PS) and polyethylene naphthalate (PEN), and the dispersed phase is formed of at least one transparent resin selected from the group consisting of a copolymer of polyethylene naphthalate (co-PEN) and syndiotactic polystyrene (sPS).

3. The optical sheet of claim 2, wherein the weight of the dispersed phase is about 5 wt % to about 40 wt % of the total weight of the continuous phase and the dispersed phase.

4. The optical sheet of claim 1, wherein at least one peak of the light condensing pattern has a cross section of a triangle with a rounded vertex.

5. The optical sheet of claim 1, wherein at least one peak of the light condensing pattern has a non-triangular polygonal cross section.

6. The optical sheet of claim 1, wherein a stretching ratio in the first direction with respect to the second direction is in the range of about 3 to about 5.

7. The optical sheet of claim 1, wherein an embossing pattern is provided on the bottom surface of the optical sheet.

8. The optical sheet of claim 1, wherein at least one peak of the light condensing pattern has a cross section of an isosceles or scalene triangle.

9. The optical sheet of claim 8, wherein the cross section is perpendicular to the peak's longitudinal direction, and the at least one peak's angle is in the range of about 85° to about 95°.

10. The optical sheet of claim 1, wherein at least one peak of the light condensing pattern has a curved cross section.

11. A backlight assembly comprising:
    an optical sheet including a base layer and a light condensing pattern formed on the base layer integrally with the base layer and including one or more peaks and one or more valleys, wherein each of the base layer and the light condensing pattern comprises a continuous phase and a dispersed phase, wherein the dispersed phase is stretched in a first direction;
    a light source for providing light to the optical sheet; and
    a reflection sheet below the light source for reflecting, in an upward direction, light which is emitted by the light source and which travels downward.

12. A backlight assembly comprising:
    an optical sheet including a base layer and a light condensing pattern formed on the base layer integrally with the base layer and including one or more peaks and one or more valleys, wherein each of the base layer and the light condensing pattern comprises a continuous phase and a dispersed phase, wherein the dispersed phase's particles have longer projections on a vertical plane parallel to a first direction than on a vertical plane parallel to a second direction perpendicular to the first direction;
    a light source for providing light to the optical sheet; and
    a reflection sheet below the light source for reflecting, in an upward direction, light which is emitted by the light source and which travels downward.

13. An optical sheet comprising:
    a base layer; and
    a light condensing pattern formed on the base layer, the light condensing pattern including one or more peaks and one or more valleys,
    wherein each of the base layer and the light condensing pattern comprises a continuous phase and a dispersed phase.

14. An optical sheet comprising:
    a base layer; and
    a light condensing pattern formed on the base layer integrally with the base layer and including one or more peaks and one or more valleys,
    wherein the base layer and the light condensing pattern comprise a continuous phase and a dispersed phase,
    wherein the dispersed phase's particles have longer projections on a vertical plane parallel to a first direction than on a vertical plane parallel to a second direction perpendicular to the first direction, and
    wherein the optical sheet transmits light oscillating in parallel to the first direction and reflects light oscillating in parallel to the second direction.

15. The optical sheet of claim 14, wherein the continuous phase is formed of at least one transparent resin selected from the group consisting of polystyrene (PS) and polyethylene naphthalate (PEN), and the dispersed phase is formed of at least one transparent resin selected from the group consisting of a copolymer of polyethylene naphthalate (co-PEN) and syndiotactic polystyrene (sPS).

16. The optical sheet of claim 15, wherein the weight of the dispersed phase is about 5 wt % to about 40 wt % of the total weight of the continuous phase and the dispersed phase.

17. The optical sheet of claim 14, wherein at least one peak of the light condensing pattern has an angle of about 85° to about 95° in a vertical cross section perpendicular to the first direction.

18. The optical sheet of claim 14, wherein an embossing pattern is provided on the bottom surface of the optical sheet.

19. The optical sheet of claim 14, wherein at least one peak of the light condensing pattern has a cross section of an isosceles or scalene triangle.

20. A method of manufacturing an optical sheet, the method comprising:

preparing a mixed resin comprising a mixture of a continuous phase resin and a dispersed phase resin;

shaping the mixed resin to provide a base layer with a light condensing pattern on a first surface of the base layer; and stretching the base layer with the light condensing pattern in a main stretching direction.

21. The method of claim 20, wherein the weight of the dispersed phase is about 5 wt % to about 40 wt % of the total weight of the continuous phase and the dispersed phase.

22. The method of claim 20, wherein forming the base layer comprises forming an embossing pattern on the base layer's second surface opposite to the first surface.

23. The method of claim 20, wherein the continuous phase resin is formed of at least one transparent resin selected from the group consisting of polystyrene (PS) and polyethylene naphthalate (PEN), and the dispersed phase resin is formed of at least one transparent resin selected from the group consisting of a copolymer of polyethylene naphthalate (co-PEN) and syndiotactic polystyrene (sPS).

24. The method of claim 20, wherein the dispersed phase is stretched in the main stretching direction and in a secondary stretching direction perpendicular to the main stretching direction.

25. The method of claim 24, wherein the optical sheet transmits light oscillating in parallel to the main stretching direction and reflects light oscillating in parallel to the secondary stretching direction.

26. The method of claim 25, wherein the stretching ratio in the main stretching direction with respect to the secondary stretching direction is in the range of about 3 to about 5.

* * * * *